United States Patent
Stepan

(10) Patent No.: US 8,327,600 B2
(45) Date of Patent: Dec. 11, 2012

(54) SUPPORT FOR AN ENTRANCE TRIM PANEL ON A CARRYING ELEMENT OF A MOTOR VEHICLE

(75) Inventor: Sven Stepan, Gross-Gerau (DE)

(73) Assignee: GM Global Technology Operations LLC, Detroit, MI (US)

( * ) Notice: Subject to any disclaimer, the term of this patent is extended or adjusted under 35 U.S.C. 154(b) by 382 days.

(21) Appl. No.: 12/340,624

(22) Filed: Dec. 19, 2008

(65) Prior Publication Data

US 2009/0158687 A1 Jun. 25, 2009

(30) Foreign Application Priority Data

Dec. 21, 2007 (DE) .......................... 10 2007 062 254

(51) Int. Cl.
*B62D 25/02* (2006.01)
*B62D 25/20* (2006.01)
(52) U.S. Cl. .................... 52/716.6; 52/288.1; 52/717.01; 52/718.01; 52/717.04; 296/209; 296/1.08
(58) Field of Classification Search ................ 52/716.1, 52/716.5, 716.6, 716.7, 716.8, 718.01, 718.04, 52/717.01, 718.05, 718.06, 718.02, 717.04, 52/288.1; 428/31, 119–120; 293/1; 296/1.08, 296/209, 29–30, 39.1, 203.02; 280/272
See application file for complete search history.

(56) References Cited

U.S. PATENT DOCUMENTS

| | | | |
|---|---|---|---|
| 3,354,584 A * | 11/1967 | Parsons ............................ | 49/377 |
| 3,622,195 A * | 11/1971 | Lautenbach .................. | 296/35.1 |
| 4,363,839 A * | 12/1982 | Watanabe et al. ................ | 428/31 |
| 4,388,355 A * | 6/1983 | Ikemizu .......................... | 428/31 |
| 5,902,007 A | 5/1999 | Koester et al. | |
| 6,062,633 A | 5/2000 | Serizawa | |
| 6,354,656 B1 * | 3/2002 | Hwang .......................... | 296/209 |
| 6,672,027 B2 * | 1/2004 | Mizutani et al. .............. | 52/716.5 |
| 6,698,154 B2 * | 3/2004 | Vance ........................... | 52/716.6 |
| 6,948,753 B2 * | 9/2005 | Yoshida et al. ............... | 296/1.08 |
| 6,974,238 B2 | 12/2005 | Sturt et al. | |
| 7,040,682 B2 * | 5/2006 | Tokumoto et al. ........... | 296/1.08 |
| 7,044,524 B2 * | 5/2006 | Luetze et al. ................ | 296/1.08 |

(Continued)

FOREIGN PATENT DOCUMENTS

| | | |
|---|---|---|
| DE | 7229223 U | 11/1972 |
| DE | 8704077 U1 | 8/1987 |
| DE | 19636505 C1 | 1/1998 |
| DE | 10344824 A1 | 4/2004 |
| DE | 60003256 T2 | 4/2004 |

(Continued)

OTHER PUBLICATIONS

Chinese Patent Office, Chinese Office Action for Chinese Application No. 200810107490.X, Dec. 13, 2010.

*Primary Examiner* — Jeanette E. Chapman
(74) *Attorney, Agent, or Firm* — Ingrassia Fisher & Lorenz, P.C.

(57) ABSTRACT

A support is provided for an entrance trim panel on a carrying element of a motor vehicle, particularly a passenger car. The space for accommodating an electrical wire harness is formed between the entrance trim panel and the carrying element. In such a support, it is proposed that the space for accommodating the electrical wire harness is formed above the carrying element, and that a supporting element is arranged between the carrying element and the entrance trim panel. The supporting element is rigidly connected to the carrying element in the region of one end and the entrance trim panel is supported in the region of the other end.

19 Claims, 3 Drawing Sheets

U.S. PATENT DOCUMENTS

| | | | |
|---|---|---|---|
| 7,140,070 B2 | 11/2006 | Yuta et al. | |
| 7,234,764 B2 * | 6/2007 | Aizawa et al. | 296/209 |
| 7,494,180 B2 * | 2/2009 | Rill | 296/209 |
| 7,842,101 B2 * | 11/2010 | Matsunaga et al. | 8/405 |
| 7,854,101 B2 * | 12/2010 | Swayne et al. | 52/716.5 |
| 7,870,697 B2 * | 1/2011 | Galas | 52/211 |
| 2001/0052210 A1 * | 12/2001 | Mizutani et al. | 52/208 |
| 2003/0110732 A1 * | 6/2003 | Vance | 52/716.5 |
| 2004/0062054 A1 * | 4/2004 | Sturt et al. | 362/545 |
| 2006/0028056 A1 * | 2/2006 | Aizawa et al. | 296/209 |

FOREIGN PATENT DOCUMENTS

| | | | |
|---|---|---|---|
| DE | 102004024338 A1 | | 12/2005 |
| EP | 1415863 A1 | | 5/2004 |
| FR | 2915154 A1 | | 10/2008 |
| JP | 57194166 A | | 11/1982 |
| JP | 2003267115 A | * | 9/2003 |
| JP | 2007230524 A | | 9/2007 |
| JP | 2008068811 A | | 3/2008 |
| KR | 2005112273 A | * | 11/2005 |

* cited by examiner

SUPPORT FOR AN ENTRANCE TRIM PANEL ON A CARRYING ELEMENT OF A MOTOR VEHICLE

CROSS-REFERENCE TO RELATED APPLICATION

This application claims priority to German Patent Application No. 102007062254.8, filed Dec. 21, 2007, which is incorporated herein by reference in its entirety.

TECHNICAL FIELD

The invention pertains to a support for an entrance trim panel on a carrying element of a motor vehicle, particularly a passenger car, with a space for accommodating an electrical wire harness is formed between the entrance trim panel and the carrying element.

BACKGROUND

A support of is described in DE 103 44 824 A1. In this case, the entrance trim panel is flatly supported on the carrying element of the motor vehicle in the region of its upper end, and this carrying element consists of the sillboard (i.e., a longitudinal beam of the vehicle). From its support on the sillboard, the entrance trim panel essentially extends to the vehicle floor laterally of the sillboard and lies on the carpet installed on the vehicle floor. On its side, the entrance trim panel is provided with a multitude of parallel profiles that form openings between one another. The space formed between the entrance trim panel, the sillboard and the carpet accommodates an electrical wire harness, as well as a multitude of lamps, such that light is emitted toward the carpet through the slots arranged in the entrance trim panel and thusly illuminates the interior of the vehicle in this region. If a person steps on an entrance trim panel that is supported in this fashion, the entrance trim panel cannot bend downward and possibly damage the electrical wire harness and the light sources because it flatly lies on top of the sillboard.

A trim panel for a sillboard is also described in DE 10 2004 024 338 A1. In this case, the entrance trim panel is directly supported on the longitudinal beam. A space for accommodating an electrical wire harness is not provided in this case.

In view of the foregoing, at least one objective exists to develop a support of the initially described type in such a way that the entrance trim panel is supported in a stable fashion referred to persons stepping thereon and the carrying element and the entrance trim panel essentially form a cable channel for an electrical wire harness. In addition, other objectives, desirable features, and characteristics will become apparent from the subsequent summary and detailed description, and the appended claims, taken in conjunction with the accompanying drawings and this background.

SUMMARY

The at least one objective, other objectives, desirable features, and characteristics, is attained in that the space for accommodating the electrical wire harness is formed above the carrying element, and in that a supporting element is arranged between the carrying element and the entrance trim panel. The supporting element is rigidly connected to the carrying element in the region of one end and the entrance trim panel is supported in the region of the other end. The supporting element is realized, in particular, with a Z-shaped or L-shaped cross section.

Due to the inventive embodiments of the support, the entrance trim panel is not supported, in particular, on the carrying element via the wire harness. Consequently, the wire harness is not damaged by introducing high forces therein. On the other hand, the supporting element is superbly capable of precisely transmitting increased forces introduced therein by a person stepping on the entrance trim panel to the carrying element. In this context, it is important that the supporting element is rigidly connected to the carrying element in the region of its end that faces the carrying element. This means that the supporting element permanently assumes a defined position relative to the carrying element. This carrying element consists, in particular, of the sillboard or the underbody of the vehicle. The supporting element is preferably welded to the carrying element. The supporting element is realized, in particular, in the form of a sheet metal element.

Due to the Z-shaped design of the supporting element that consequently features two outer limbs and a crosspiece connecting these limbs, the limb connected to the carrying element and the adjoining crosspiece form a preformed part that forms two sides of a conventionally used cable channel for a wire harness. Consequently, such a separate cable channel that is usually assembled of interconnected plastic parts is not required due to the arrangement of the supporting element and its shape. On the contrary, the supporting element functionally forms the cable channel together with the carrying element and the rigidly supported entrance trim panel.

Although a supporting element that is designed in an L-shaped fashion does not largely form a cable channel for a wire harness, it is completely adequate for sufficiently configuring the cable channel for accommodating the wire harness in connection with the carrying element. The wire harness lies on the carrying element and is laterally bounded by one limb of the L-shaped supporting element. The rigid entrance trim panel is supported above the wire harness, namely at a certain distance there from.

The entrance trim panel preferably can be connected to the carrying element in a snap-on fashion. The carrying element, in particular, is provided with holes and the entrance trim panel is connected to clip elements that can be clipped into the holes. Due to these measures, the entrance trim panel not only can be quickly and easily connected to the carrying element, but the various snap-on connections, if arranged accordingly, also form the fourth side of the boundary for the wire harness such that the wire harness is surrounded on all sides similar to a cable channel once the entrance trim panel is installed.

Due to the Z-shaped or L-shaped design of the supporting element, the entrance trim panel does not have to absorb increased bending stresses when a person steps on the entrance trim panel. Consequently, the entrance trim panel can be manufactured with relatively thin walls, particularly in the form of an injection-molded plastic part.

In the region of its end that faces away from the vehicle door, the entrance trim panel preferably overlaps a carpet that covers the carrying element. The entrance trim panel therefore is mounted by means of the clip elements only.

In order to optimally transmit forces into the carrying element via the entrance trim panel and the supporting element, the lower free limb of the Z-shaped covering element should flatly lie on the carrying element. The crosspiece that connects the two free limbs of the Z-shaped supporting element preferably is essentially oriented vertically. This orientation corresponds to the direction, in which forces are introduced when a person steps on the entrance trim panel. The lower free limb and/or the upper free limb of the Z-shaped supporting element preferably are essentially oriented horizontally. With respect to the horizontal orientation of the upper free limb of the supporting element, it is advantageous to provide the underside of the entrance trim panel with ribs that flatly contact the supporting element, particularly the upper free limb thereof.

If the supporting element is realized in an L-shaped fashion, the forces are also optimally introduced into the carrying element via the entrance trim panel and the supporting element. In this case, one limb of the supporting element is essentially oriented vertically and rigidly connected to the carrying element, particularly welded thereto, while the other limb is essentially oriented horizontally and serves as a support for the entrance trim panel.

BRIEF DESCRIPTION OF THE DRAWINGS

The embodiments of present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
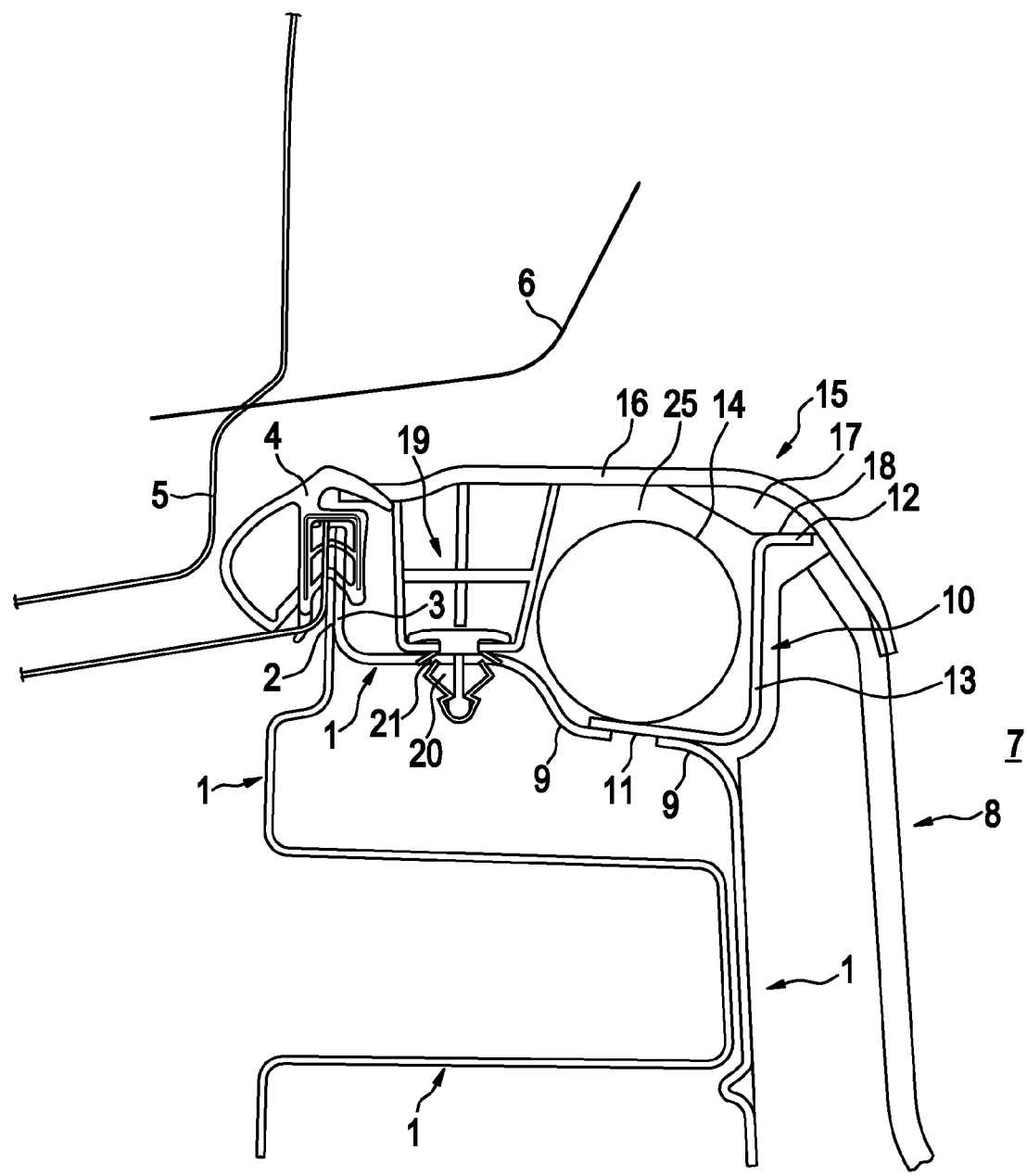
FIG. 1 shows a first embodiment of the support of the entrance trim panel on the longitudinal sillboard of a motor vehicle in the region of a front vehicle door, namely in the form of a cross section referred to the longitudinal direction of a passenger car.

FIG. 1 shows the basic structure of a passenger car in the region of its carrying element that consists of a longitudinal sillboard 1. This longitudinal sillboard 1 is composed of several sheet metal elements that are welded to one another.

Two sheet metal elements 2 and 3 of the longitudinal sillboard 1 are directed upward and welded to one another. These sheet metal elements form a support for an attached seal 4 that is contacted by the closed front door of the passenger car, only the contour 6 of which is indicated in the figure. The contour 6 indicates the door paneling. A carpet that is identified by the reference numeral 8 and features an insulating layer is installed in the interior 7 of the passenger car and abuts the vertically ascending region of the longitudinal sillboard 1. The longitudinal sillboard 1 features a sheet metal cover 9. The sheet metal cover 9 forms the upper end of the longitudinal sillboard 1 and a supporting element 10 of sheet metal that has a Z-shaped cross section is welded to the sheet metal cover 9 adjacent to the carpet 8. The supporting element 10 is composed of a longer lower limb 11, a shorter upper limb 12 and a crosspiece 13 that connects the two limbs 11 and 12. The free end of the limb 11 is directed toward the seal 4 and the free end of the limb 12 is directed away from the seal 4. The limb 12 is essentially oriented horizontally. An electrical wire harness 14 lies on the limb 11 such that its essentially circular cross section essentially occupies the rectangular area or parallelogram-shaped area defined by the limb 11 and the crosspiece 13. The region above the sheet metal cover 9 is covered with an entrance trim panel 15. This entrance trim panel is realized in the form of an injection-molded plastic part. An upper plate-shaped section 16 of the entrance trim panel 15 covers the carpet 8 in the region of its end that faces the interior 7 of the passenger car and contacts the end of a plate-shaped section 16 of the seal 4 that faces this end. On its underside, the plate-shaped section 16 features a multitude of parallel ribs 17 that extend in the transverse direction of the vehicle. The respective ribs form a lower horizontal support surface 18 that is supported on the horizontally extending limb 12 of the supporting element 10. In its region that faces the seal 4, the underside of the plate-shaped section 16 is provided with several projections 19 that accommodate the clip elements 20. These clip elements are clipped into holes 21 in the sheet metal cover 9 of the longitudinal sillboard 1 and therefore serve for mounting the entrance trim panel 15 on the longitudinal sillboard 1.

Due to these measures, a space 25 for accommodating an electrical wire harness 14 is formed between the entrance trim panel 15 and the longitudinal sillboard 1.

The dimensions of the entrance trim panel 15 and of the Z-shaped supporting element 10 are chosen such that the electrical wire harness 14 is positioned between and slightly spaced apart from the projections 19 and the crosspiece 13 of the supporting element 10 and a sufficiently large gap remains between the top of the wire harness and the plate-shaped section 16 of the entrance trim panel 15. If a person steps on the entrance trim panel 15 which covers the passenger door threshold, vertically introduced forces are not transmitted into the wire harness 14, but rather directly into the longitudinal sillboard 1 via the Z-shaped supporting element 10.

Figure 2:
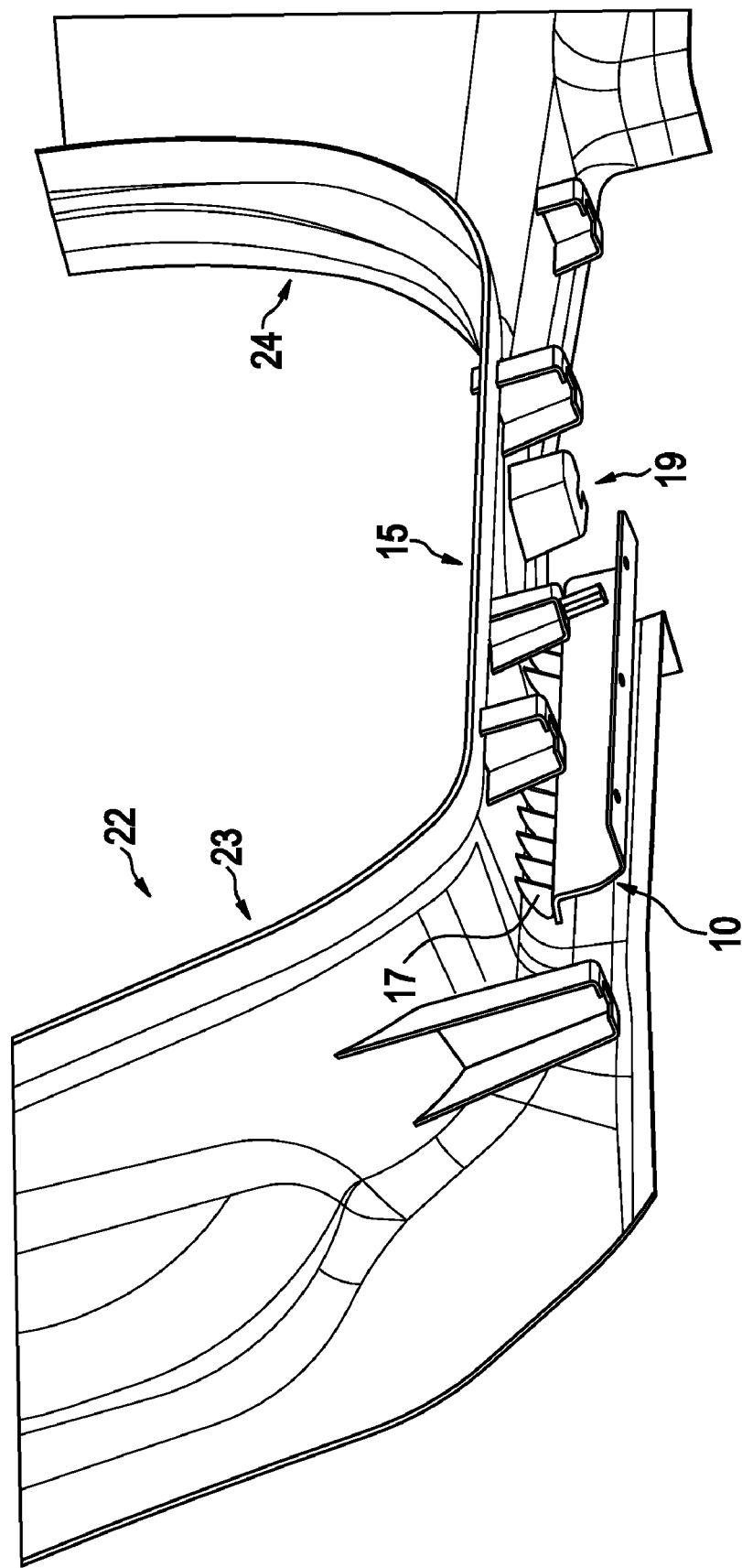
FIG. 2 shows an oblique bottom view of the entrance trim panel according to the first embodiment with the Z-shaped supporting element.

FIG. 2 shows the arrangement of the entrance trim panel 15 and the supporting element 10. According to this figure, the entrance trim panel 15 forms part of a molded element 22 that not only serves for covering the longitudinal sillboard 1 near the lower contour of the door of the passenger car in the region of the entrance trim panel 15, but also for covering the B-column of the vehicle with its section 23 and for covering the region situated adjacent to the A-column with its section 24.

Figure 3:
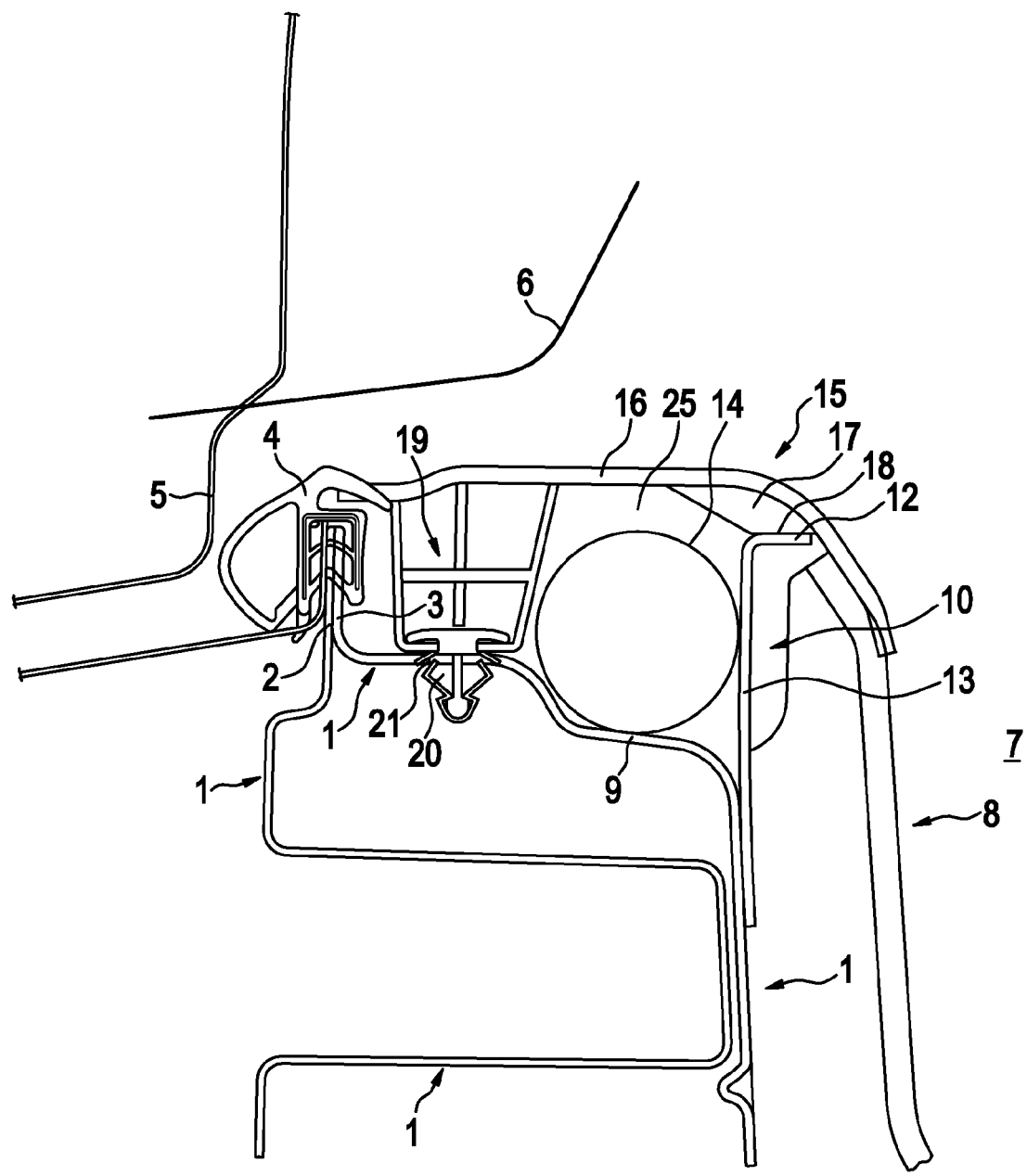
FIG. 3 shows a second embodiment with an L-shaped supporting element, namely in the form of a sectional representation according to FIG. 1.

FIG. 3 shows a sectional representation of the arrangement according to FIG. 1, however, with a modified design of the supporting element 10 that is realized with an L-shaped cross section rather than a Z-shaped cross section, namely in the form of an upside down "L." Components that correspond to the embodiment according to FIG. 1 and FIG. 2 with respect to their design and arrangement are identified by the same reference numerals for reasons of simplicity.

The embodiment according to FIG. 3 can be distinguished from the embodiment according to FIG. 1 and FIG. 2 in that the supporting element 10 does not feature a crosspiece 13. The vertically arranged limb 12 of the supporting element 10 is instead extended and connected to a vertical section of the longitudinal sillboard 1, particularly welded thereto. The lower region of the limb 12 therefore is situated between the longitudinal sillboard 1 and the carpet with its insulating layer that is identified by the reference numeral 8. Analogous to the Z-shaped design of the supporting element 10, the entrance trim panel 15 also lies on the limb 12 of the supporting element 10 in the region of its various ribs 17 in the L-shaped design of the supporting element 10. Since no limb 11 is provided in this embodiment, the electrical wire harness 14 lies directly on the sheet metal cover 9.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A support structure for a motor vehicle, comprising:
   a wiring harness:
   a sillboard extending longitudinally underneath a passenger door threshold of said vehicle;
   an entrance trim panel covering said threshold and having a flat, horizontal stepping surface; and
   a supporting element rigidly connected to said sillboard and configured to vertically support said stepping surface;
   wherein said supporting element is further configured to define a longitudinally extending space between said sillboard and said trim panel, said wiring harness being disposed within said space.

2. The support structure according to claim 1, wherein the supporting element is constructed of sheet metal.

3. The support structure according to claim 1, wherein said entrance trim panel is connected to said sillboard in a snap-on fashion.

4. The support structure according to claim 3, wherein said sillboard is provided with holes and said entrance trim panel is connected to clip elements configured to be clipped into said holes.

5. The support structure according to claim 1, wherein said sillboard comprises sheet metal.

6. The support structure according to claim 1, wherein said entrance trim panel is an injection-molded part.

7. A support for a motor vehicle wiring harness, comprising:
   a sillboard extending longitudinally underneath a passenger door threshold of said vehicle;
   an entrance trim panel covering said threshold and having a flat, horizontal stepping surface; and
   a supporting element rigidly connected to said sillboard and configured to vertically support said stepping surface;
   wherein said supporting element is further configured to define a longitudinally extending space between said sillboard and said trim panel, said wiring harness being disposed within said space; and
   wherein said entrance trim panel is supported on a carpet that covers said sillboard.

8. The support structure according to one of claim 1, wherein said supporting element has a Z-shaped cross section.

9. The support structure according to one of claim 1, wherein said supporting element has an L-shaped cross section.

10. A support for a motor vehicle wiring harness, comprising:
    a sillboard extending longitudinally underneath a passenger door threshold of said vehicle;
    an entrance trim panel covering said threshold and having a substantially horizontal stepping surface; and
    a supporting element rigidly connected to said sillboard and configured to vertically support said stepping surface;
    wherein said supporting element is further configured to define a longitudinally extending space between said sillboard and said trim panel, said wiring harness being disposed within said space;
    wherein said supporting element has a Z-shaped cross section, and further wherein said Z-shaped supporting element comprises a lower limb which flatly lies on said sillboard; and
    wherein said supporting element comprises a crosspiece connected to said lower limb, and wherein said crosspiece is essentially oriented vertically.

11. The support structure according to one of claims 10, wherein said supporting element further comprises an upper limb, and wherein at least one of said lower limb and said upper limb is essentially oriented horizontally.

12. A support structure for a motor vehicle, comprising:
    a wiring harness:
    a sillboard extending longitudinally underneath a passenger door threshold of said vehicle;
    an entrance trim panel covering said threshold and having a substantially horizontal stepping surface; and
    a supporting element rigidly connected to said sillboard and configured to vertically support said stepping surface;
    wherein said supporting element is further configured to define a longitudinally extending space between said sillboard and said trim panel, said wiring harness being disposed within said space;
    wherein said supporting element has an L-shaped cross section; and
    wherein said supporting element comprises a vertical crosspiece connected to a horizontal limb which flatly lies on said sillboard.

13. The support structure according to claim 12, wherein said crosspiece is essentially oriented horizontally and rigidly connected to said sillboard.

14. A support for a motor vehicle wiring harness, comprising:
    a sillboard extending longitudinally underneath a passenger door threshold of said vehicle;
    an entrance trim panel covering said threshold and having a flat, horizontal stepping surface; and
    a supporting element rigidly connected to said sillboard and configured to vertically support said stepping surface;
    wherein said supporting element is further configured to define a longitudinally extending space between said sillboard and said trim panel, said wiring harness being disposed within said space;
    wherein an underside of said entrance trim panel is provided with ribs that contact said supporting element.

15. The support structure according to claim 8, wherein said supporting element is configured to transfer force placed on said stepping surface to said sillboard.

16. The support structure according to claim 10 wherein said crosspiece is adjacent to and extends longitudinally alongside said wire harness.

17. The support structure according to claim 12, wherein said crosspiece connects directly to said sillboard.

18. A support structure for use in a motor vehicle, comprising:
    a wiring harness;
    a passenger door threshold;
    a substantially horizontal, flat trim panel covering said threshold;
    a sillboard extending longitudinally underneath said threshold; and
    a sheet metal support element rigidly connected to said sillboard and configured to vertically support said trim panel, said support element defining a space between said sillboard and said trim panel within which said wiring harness is disposed.

19. The support structure according to claim 18, wherein said support element has a Z-shaped cross section and is configured to transfer force placed on said trim panel to said sillboard.

* * * * *